(12) United States Patent
Bruns

(10) Patent No.: US 7,249,772 B2
(45) Date of Patent: Jul. 31, 2007

(54) BEVERAGE COOLER

(76) Inventor: Kevin L. Bruns, 5055 Shattuc, Cincinnati, OH (US) 45208

( * ) Notice: Subject to any disclaimer, the term of this patent is extended or adjusted under 35 U.S.C. 154(b) by 172 days.

(21) Appl. No.: 10/958,132

(22) Filed: Oct. 4, 2004

(65) Prior Publication Data

US 2006/0017245 A1    Jan. 26, 2006

(51) Int. Cl.
   *B62B 11/00*   (2006.01)
(52) U.S. Cl. .............. 280/47.34; 280/79.4; 220/915.2; 62/457.1; 224/42.12
(58) Field of Classification Search ........... 280/47.34, 280/79.4; 220/592.16, 592.17, 592.2, 915.1, 220/915.2; 62/371, 457.1, 457.7; 224/42.12, 224/0.5; 441/42; 152/208, 209.1
See application file for complete search history.

(56) References Cited

U.S. PATENT DOCUMENTS

| | | | | |
|---|---|---|---|---|
| 1,652,600 A * | 12/1927 | Beers | ................... | 220/592.16 |
| 3,533,529 A * | 10/1970 | Helbig | ................... | 220/560 |
| 3,693,998 A * | 9/1972 | Cummins | ................ | 280/87.01 |
| 3,743,130 A * | 7/1973 | Jorgensen | ................... | 383/38 |
| 4,062,158 A | 12/1977 | Kaufmann et al. | ............. | 52/71 |
| D290,674 S | 7/1987 | Valov | ........................... | D7/71 |
| 4,724,681 A * | 2/1988 | Bartholomew et al. | ....... | 62/239 |
| 4,791,702 A * | 12/1988 | McVey | ........................ | 16/428 |
| D323,765 S * | 2/1992 | Corthum | ..................... | D7/556 |
| 5,190,194 A * | 3/1993 | Rosner et al. | ............... | 224/0.5 |
| 5,277,328 A * | 1/1994 | Tocco | ........................... | 220/507 |
| 5,447,110 A * | 9/1995 | Brown | ........................ | 141/2 |
| 5,462,211 A * | 10/1995 | Eversoll | .................. | 224/42.14 |
| 5,755,630 A * | 5/1998 | Malwitz | ..................... | 473/429 |
| 6,047,848 A * | 4/2000 | Davis | ......................... | 220/666 |
| D428,955 S | 8/2000 | Peterson | ..................... | D21/801 |
| 6,331,128 B1 | 12/2001 | Schmick | ..................... | 441/129 |
| D453,893 S * | 2/2002 | Mount | ........................ | D7/608 |
| 6,406,098 B1 * | 6/2002 | Linder | .................... | 297/452.41 |
| 6,446,988 B1 * | 9/2002 | Kho | ......................... | 280/47.26 |
| 6,497,424 B2 * | 12/2002 | Gartner et al. | ............. | 280/47.4 |
| 6,920,995 B2 * | 7/2005 | Bowen et al. | ........... | 220/592.1 |
| 6,981,706 B1 * | 1/2006 | Kramer | ..................... | 280/21.1 |

\* cited by examiner

*Primary Examiner*—Christopher Bottorff
(74) *Attorney, Agent, or Firm*—Wood, Herron & Evans, LLP

(57) ABSTRACT

A portable beverage cooler comprises an automobile tire and a bottom membrane attached thereto. Optionally, a drain valve may be inserted in the side wall of the tire to facilitate draining liquid from inside the beverage cooler. Additionally, a pair of handles may be attached to the cooler to enhance its portability. Also, a base may be attached to the tire and/or rollers may be attached to the base or to the tire to increase the portability and point-of-sale functionality of the cooler.

15 Claims, 3 Drawing Sheets

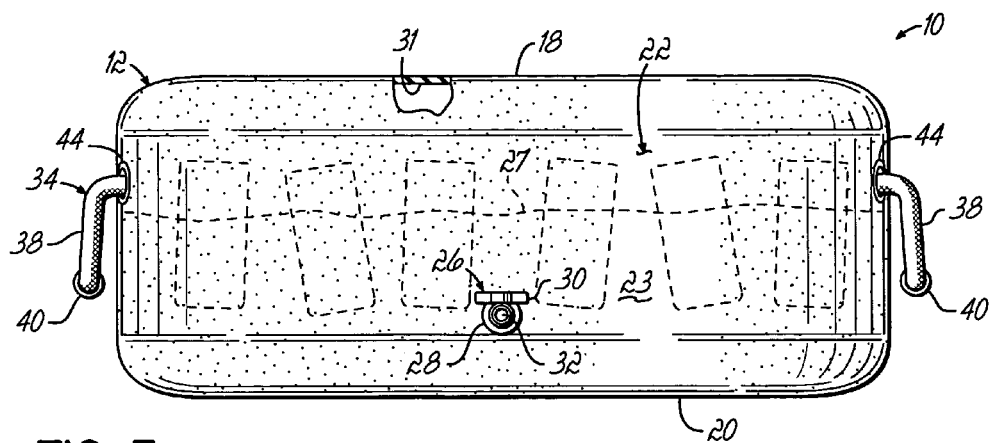
FIG. 3
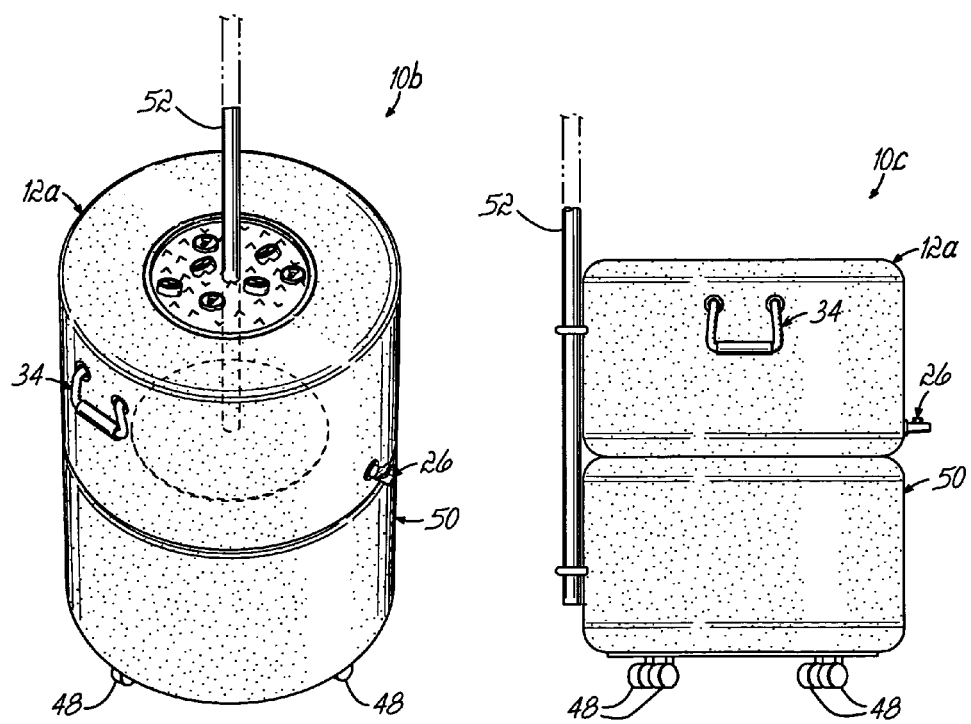
FIG. 4A
FIG. 4B

BEVERAGE COOLER

CROSS-REFERENCE TO RELATED APPLICATIONS

The present application claims benefit of U.S. Design application Ser. No. 29/209,779, filed Jul. 21, 2004, the disclosure of which is hereby incorporated herein by reference in its entirety.

FIELD OF THE INVENTION

This invention relates to coolers and a method for making coolers.

BACKGROUND OF THE INVENTION

Coolers for holding beverages or other food items desired to be kept cool are well known. Coolers come in a variety of sizes and shapes and are made out of various sorts of insulting materials such as foam or resilient polystyrene plastic, e.g., STYROFOAM®. Coolers are commonly filled with ice in order to cool beverages or other items or to maintain the cool temperature of those items. Coolers filled with ice are used at quick stop gasoline stations to display cool beverages and allow patrons convenient access to the beverages on sale. In such applications, the size, shape, and style of the cooler may have an effect on attracting a potential customer's attention and furthering a sale.

Coolers filled with ice are also commonly brought to sporting events, particularly outdoor summer sporting events such as auto races. Coolers are used for tailgate parties before and after sporting events or on the sidelines or pit stops during the events. Coolers specifically adapted for a particular sports genre would be desirous.

During a typical automobile race, the tires on the race cars are periodically changed. Race car tires and tires in general have a limited tread life. When they become worn, to improve performance and/or safety, they are replaced. During a typical auto race, one race car may use 3-5 sets of tires. Replaced race car tires are typically shredded and their disposal may be costly and environmentally unfriendly. Occasionally, used tires may be used around traffic cones or on loading docks.

It would be desirous to have a cooler with increased marketing appeal at quick stop gasoline stations. It would also be desirous to have a cooler that would be unique to the auto racing industry. Finally, it would be desirous to create another use for worn tires, particular worn tires that have a particular significance, e.g., the tires from a winning race car.

SUMMARY OF THE INVENTION

This invention addresses these desires by using a rubber automobile tire to create a portable beverage cooler. Specifically, a membrane or bottom wall is attached to an automobile tire, e.g., a racing slick tire from a race car. This creates a container which can hold ice and cool beverages or other items. Optionally, a drain valve may be inserted in the side wall of the tire to facilitate the draining of liquid, e.g., water, from inside the cooler. Additionally, a pair of handles may be attached to the cooler to enhance its portability. Also, a base may be attached to the tire and/or rollers may be attached to the base or to the tire to increase the portability and point-of-sale functionality of the cooler.

BRIEF DESCRIPTION OF THE DRAWINGS

The objectives and features of the invention will become more readily apparent from the following detailed description taken in conjunction with the accompanying drawings in which:

FIG. 3 is a front view of the beverage cooler of FIG. 1; and

FIG. 4A is a perspective view of another alternative embodiment of the beverage cooler of the present invention.

FIG. 4B is a side view of yet another alternative embodiment of the beverage cooler of the present invention.

DETAILED DESCRIPTION OF THE INVENTION

Figure 1:
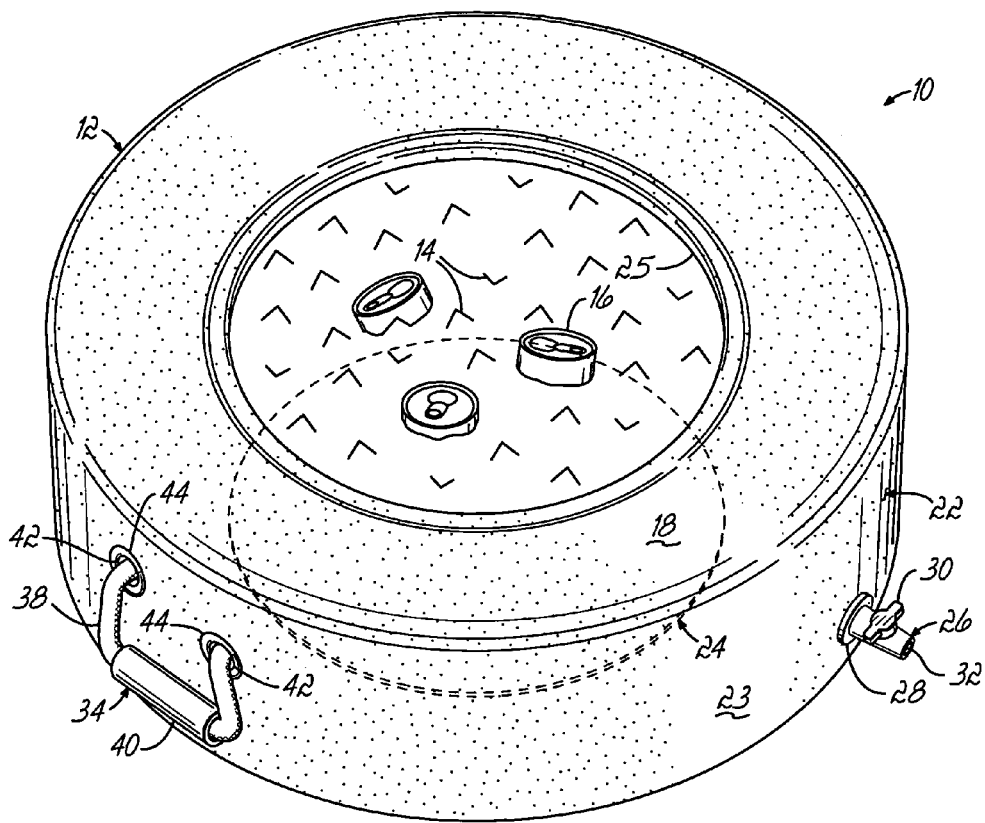
FIG. 1 is a perspective view of one preferred embodiment of the beverage cooler of the present invention filed with ice and beverages.
Figure 2:
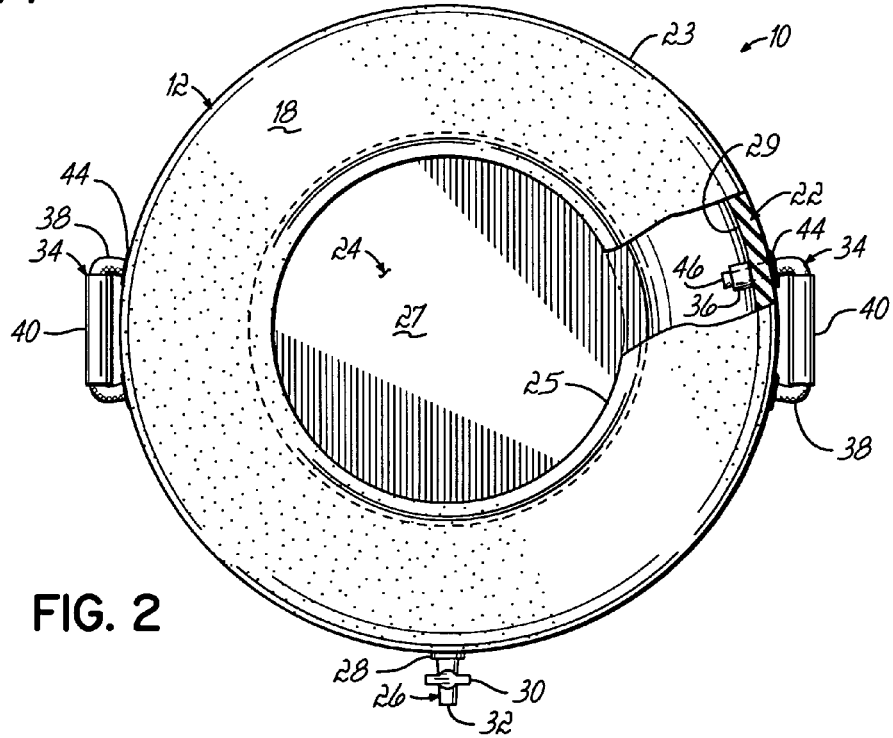
FIG. 2 is a top view, partially broken away, of the beverage cooler of FIG. 1, the cooler being empty.

As shown in FIGS. 1-3, the portable beverage cooler 10 is typically made from a tire 12, e.g. a rubber automobile tire. However, the tire 12 may be made of any material without departing from the spirit of the present invention. These tires 12 may be new or may be used or recycled tires 12. Some used tires 12, e.g., the racing slick tires 12 from a favorite or winning race car, or a particular brand or style of tire 12, may have a particular significance and be particularly desirous of use. The type of tire 12 selected can also have a functional significance. For example, the width and diameter of the tire 12 will determine the size of the beverage cooler 10 and the amount of ice 14 and beverages 16 it can contain. Tires 12 suitable for use may be obtained from Competition Tire West, Inc., 12666 U.S. 12, Post Office Box 666, Brooklyn, Mich. 49230.

The tire 12 has a pair of generally parallel side walls 18, 20 that are connected by a circular tread wall 22 having an outer surface 23. A bottom wall 24 is attached or sealed to the tire 12 whereby a beverage cooler 10 capable of holding ice 14 and beverages 16 is formed. This bottom wall or membrane 24 may be placed within the tire 12 so as to rest upon and be supported by the bottom side wall 20 of the tire. The bottom wall or membrane 24 is preferably made of rubber, but may be made of any other desired material, such as plastic, or a roofing composite material. This bottom wall 24 is preferably attached to the bottom side wall 20 of the tire 12 with an adhesive. However, any other means such as using mechanical fasteners (not shown) may be used to secure the bottom wall 24 of the cooler 10 to the bottom side wall 20 of the tire 12.

The interior surface 27 of the bottom wall 24, the interior surface 29 of the tread wall 22, and the interior surface 31 of the top side wall 18 may be coated so as to increase the insulating effect of the cooler, enhance the aesthetic appearance (e.g., by using a white coating), and to promote the sealing and/or attachment of the bottom wall 24 to the tire 12. Typically these surfaces are sprayed with an expandable rubberized paint although other types of coatings or methods of application could be used. The rubberized paint will expand to between approximately ½ to ¾ of an inch in thickness. This type of coating provides a pliable shiny white surface.

A circular opening 25, defined by the opposite sidewall 18, as shown is left open to facilitate easy access to the beverages 16. Optionally, a lid or other covering (not shown) could be used to cover this opening 25.

A drain or drain valve 26 may also be attached to the tire 12. This drain valve 26 may be a spigot or a spout and, as shown, is attached to and penetrates through the tread wall 22 of the tire 12. As shown, the drain valve 26 has a seal ring or gasket 28 attached to the outer surface 23 of the tread wall 22 and a twist valve 30 which opens or closes the drain 26. When the drain 26 is open, liquid 27, such as water from melted ice 14 can drain out of the cooler 10 through the drain lumen 32. A ball valve suitable for use for the drain valve 26 is available from American Valve, Greensboro, N.C.

The beverage cooler 10 may also contain one or more handles 34. The inclusion of handles 34 will often enhance the portability of the cooler 10. Additionally, including two or more handles 34 will allow the cooler 10 to be carried by more than one person. Such handles may be particularly desirous if the cooler 10 is quite large, quite heavy (e.g. when filled with ice and beverages) or when the distance needed to travel is quite large. As shown, each handle 34, comprises a cord or rope 38 and a sleeve or handle grip 40 surrounding the length of cord or rope 38. Typically, the chord 38 will be comprised of heavy braided nylon and the sleeve 40 will be comprised of rubber or vinyl. A solid braided poly rope suitable for use for the rope or chord 38 is available from The Lehigh Group, 2834 Schoeneck Road, Macungie, Pa. 18062. A one inch vinyl tube suitable for use for the sleeve 40 is available from Watts Anderson Barrows, 815 Chestnut Street, North Andover, Mass. 01845-6098. The chord 38 passes through eyelets or apertures 42 in the tread wall 22. As shown, a clamp 36 is attached to the chord 38 and prevents the chord 38 from passing back through the eyelets 42. Alternatively the ends 46 of the chord 38 may be tied in a knot or tied together to prevent the chord 38 from passing back through the eyelets 42. Still other means of preventing the chord 38 from passing back through the eyelets 42 could be used without departing from the spirit of the present invention. A pair of grommets 44 are attached to the tread surface 22 and reinforce the eyelets 42. The grommets 44 are preferably brass and are comprised of male and female sections which clamp together and against the tread surface 23 and the interior surface 29 of the trend wall 22. Optionally, the eyelets 42 could be sealed to prevent leakage.

Although one configuration of handle is illustrated and described, any other type or configuration of handle may be used in accordance with the present invention.

Figure 4:
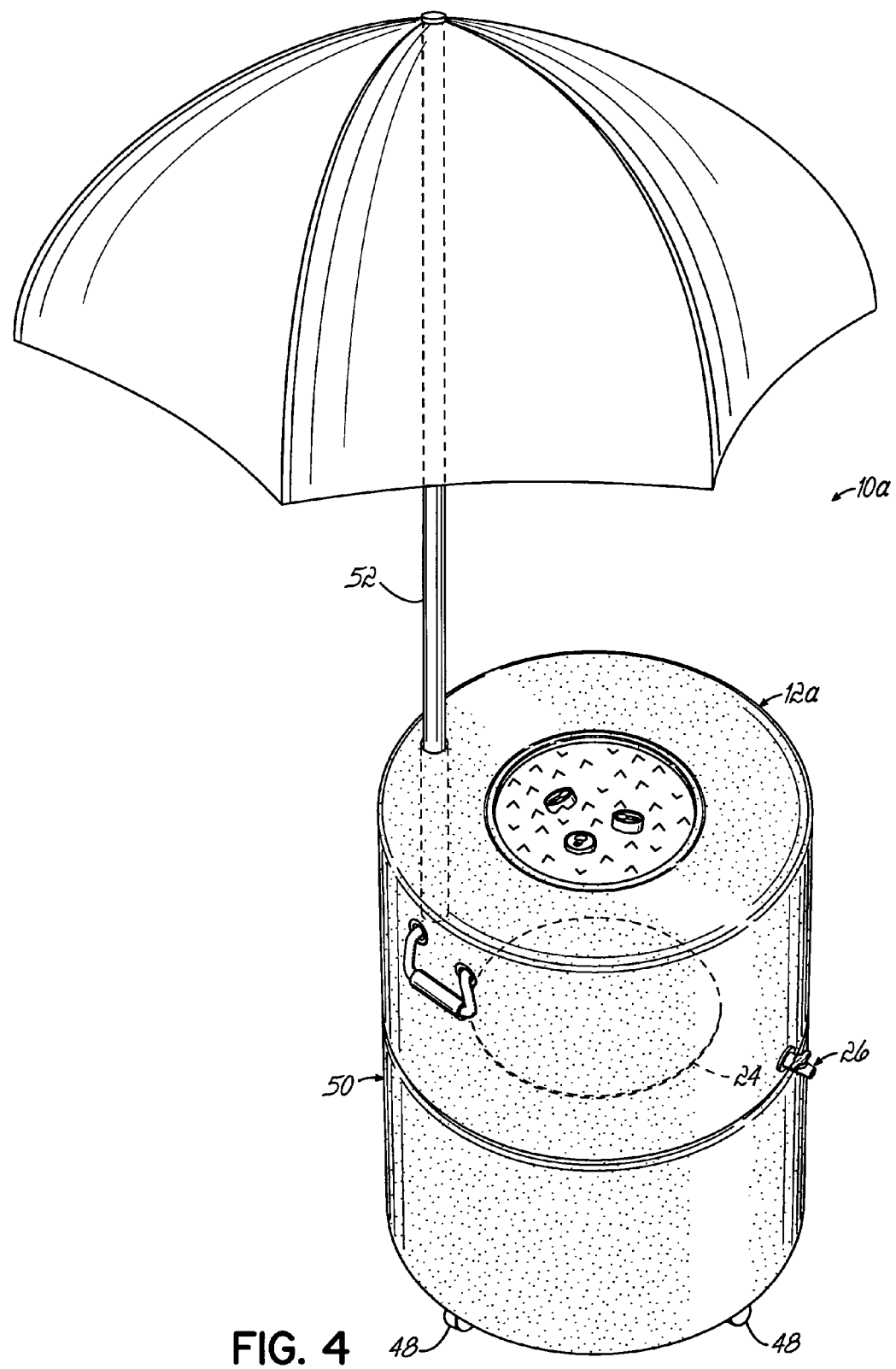
FIG. 4 is a perspective view of an alternative embodiment of the beverage cooler of the present invention.

As shown in FIGS. 4, 4A and 4B, where like numbers denote like parts, alternative embodiments 10a, 10b, 10c of the present invention include coasters, casters, rollers, or wheels 48 to facilitate moving the cooler 10. As shown, the rollers 48 are attached to a base 50. While not shown, rollers 48 could also be attached to the tire 12 in the embodiment of the invention shown in FIGS. 1-3. Threaded Stem Rigid Casters (Grainger Catalog stock #5X750) suitable for use for the rollers 48 are available from E. R. Wagner Casters & Wheels.

The base 50 is adapted to support the tire 12. The tire 12a may be secured to the base 50 through the use of an adhesive or mechanical fasteners (not shown). As shown, the base 50 is comprised of another tire. Alternatively, the base 50 could be comprised of one or more additional tires or of other materials without departing from the scope of the invention. Additionally, as shown, an umbrella 52 is used to shade and further the insulating properties of the cooler 10.

The method of making the portable beverage cooler 10 comprises providing a tire 12 and attaching a bottom wall 24 to the tire 12. As discussed, the tire 12 could be an automobile tire 12. Additionally, the method for making a cooler 10 can also comprise the step of attaching a drain valve 26 to the tire 12. The method of making a cooler 10 may also include the step of attaching at least one handle 34 to the tire 12. Finally, the handle 34, as discussed, can be comprised of a chord 38 and a sleeve 40.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A cooler comprising:
   a tire having a pair of generally parallel side walls connected by a tread wall;
   a drain valve attached to and penetrating the tread wall; and
   a bottom wall attached to said tire.

2. The cooler of claim 1 wherein the tire is an automobile tire.

3. The cooler of claim 1 wherein the tire is comprised of rubber.

4. The cooler of claim 1 wherein the bottom wall is comprised of rubber.

5. The cooler of claim 1 further comprising a drain attached to the tire.

6. The cooler of claim 1 further comprising a base attached to the tire.

7. The cooler of claim 6 further comprising at least one roller attached to the base.

8. The cooler of claim 1 further comprising at least one handle attached to the tire.

9. The cooler of claim 8 wherein the handle is comprised of a cord and a sleeve.

10. The cooler of claim 9 wherein the cord is comprised of heavy braided nylon.

11. The cooler of claim 9 wherein the sleeve is comprised of vinyl.

12. A portable beverage cooler comprising:
    a rubber automobile tire having a pair of generally parallel side walls connected by a circular tread wall;
    a bottom membrane attached to one of the side walls;
    a drain valve attached to and penetrating the tread wall; and
    a pair of handles attached to the tread wall.

13. The cooler of claim 12 wherein each handle is comprised of a cord and a sleeve.

14. The cooler of claim 12 further comprising a base attached to the tire.

15. The cooler of claim 14 further comprising at least one roller attached to the base.

* * * * *